United States Patent [19]

Coaker et al.

[11] 3,841,890
[45] Oct. 15, 1974

[54] PLASTICIZER SYSTEMS FOR POLYVINYL BUTYRAL INTERLAYERS

[75] Inventors: Anthony W. M. Coaker, St. Louis; Joseph R. Darby, Webster Groves; Thomas C. Mathis, St. Louis, all of Mo.

[73] Assignee: Monsanto Company, St. Louis, Mo.

[22] Filed: Dec. 7, 1972

[21] Appl. No.: 313,151

[52] U.S. Cl......... 106/316, 260/30.6 R, 260/31.8 G, 260/31.8 L
[51] Int. Cl.................... C08k 1/36, C08f 45/50
[58] Field of Search..... 260/30.6 R, 31.8 G, 31.8 L; 106/316

[56] References Cited
UNITED STATES PATENTS

| | | | |
|---|---|---|---|
| 1,960,520 | 5/1934 | Watkins | 260/31.8 G |
| 2,046,886 | 7/1936 | Strain | 260/31.8 G |
| 2,124,315 | 7/1938 | Ryan | 106/22 |
| 2,138,889 | 12/1938 | Smith et al. | 260/31.8 G |
| 2,182,359 | 12/1939 | Smith et al. | 260/31.8 G |
| 2,290,135 | 7/1942 | Kirkpatrick | 49/92 |
| 2,517,218 | 8/1950 | Lawrence | 260/41 |
| 2,526,723 | 10/1950 | Birk et al. | 154/2.77 |
| 3,644,594 | 2/1972 | Mont et al. | 260/901 |

*Primary Examiner*—Morris Liebman
*Assistant Examiner*—S. L. Fox
*Attorney, Agent, or Firm*—William J. Farrington; Edward P. Grattan; James C. Logomasini

[57] ABSTRACT

Disclosed herein are plasticizer systems for polyvinyl butyral interlayers used in laminated safety glass. The plasticizer system is a blend of a phosphate plasticizer and a diester of an alipahtic dicarboxylic acid wherein the diester contains from 14 to 28 carbon atoms. The blend allows the use of many phosphate and diester plasticizers which are unsuitable when used alone.

7 Claims, No Drawings

PLASTICIZER SYSTEMS FOR POLYVINYL BUTYRAL INTERLAYERS

BACKGROUND OF THE INVENTION

1. Field of the Invention

The present invention relates to plasticizer systems for polyvinyl butyral interlayers used in laminated safety glass. More particularly, the present invention relates to plasticizer systems which are blends of a phosphate plasticizer and a diester of an aliphatic dicarboxylic acid wherein the diester contains from 14 to 28 carbon atoms.

2. Description of the Prior Art

Laminated safety glass using plasticized polyvinyl butyral interlayers is widely used in automobile windshields and in certain architectural applications. Despite the fact that the prior art teaches a seemingly endless variety of plasticizers for polyvinyl butyral, only a few such plasticizers have enjoyed widespread commercial use in automobile windshields. The reason for this is that the laminated safety glass used in windshields and architectural applications must meet very rigid performance standards. For one reason or another many plasticizers for polyvinyl butyral will not provide the properties required in these high performance applications. One such property that is required in laminated safety glass is edge stability or resistance to delamination. Many otherwise suitable plasticizers for polyvinyl butyral fail to qualify for interlayer use because they increase the susceptibility of the laminate to delaminate. In other words, they fail to provide the necessary laminate stability.

SUMMARY OF THE INVENTION

The present invention fulfills a need in the art by providing plasticizer systems for polyvinyl butyral interlayers for use in laminated safety glass. The plasticized systems are blends of two or more plasticizers which are not normally suitable for use in polyvinyl butyral interlayer material when used alone. More important, the interlayers prepared using the plasticizer blends of the present invention exhibit excellent edge stability which makes them especially useful in the preparation of glazing units for automobile windshields and certain architectural and vehicular applications which are constantly exposed to the weather. This edge stability is obtained without sacrificing any of the other desirable properties such as optical clarity, impact strength, etc.

The plasticizer systems of the present invention comprise a blend of (1) at least one phosphate plasticizer and (2) at least one diester plasticizer wherein the phosphate plasticizer corresponds to the following general formula:

$R_3PO_4$ wherein R is selected from the group consisting of aryl, alkaryl wherein the alkyl group contains from 1 to 3 carbon atoms, alkyl of from 1 to 12 carbon atoms, alkoxyalkyl of from 1 to 9 carbon atoms and cycloalkyl, with the proviso that when all of the radicals represented by R in a given compound are alkyl radicals each alkyl radical must have 4 or more carbon atoms; wherein the diester plasticizer is a diester of an aliphatic dicarboxylic acid which diester contains from 14 to 28 carbon atoms wherein the dicarboxylic acid moiety of the diester contains from 4 to 8 carbon atoms and wherein the alcohol moiety of the ester is selected from the group consisting of alkyl and alkoxyalkyl radicals containing from 3 to 12 carbon atoms; wherein the phosphate plasticizer and the diester plasticizer have vapor pressures of less than 10 millimeters (mm) at 175°C.; and wherein the ratio of phosphate plasticizer to diester plasticizer is in the range from 5:95 to 95:5.

DESCRIPTION OF THE PREFERRED EMBODIMENTS

The phosphate plasticizers used in the present invention correspond to the following general formula:

$R_3PO_4$ wherein R is selected from the group consisting of aryl, alkaryl wherein the alkyl group contains from 1 to 3 carbon atoms, alkyl of from 1 to 12 carbon atoms, alkoxyalkyl of from 1 to 9 carbon atoms and cycloalkyl, with the proviso that when all of the radicals represented by R in a given compound are alkyl radicals each alkyl radical must have 4 or more carbon atoms. It is possible for R to represent different radicals in the same phosphate plasticizer. Moreover, mixtures of these phosphate plasticizers may be used in combination with the diesters to plasticize the polyvinyl acetal in accordance with this invention.

Examples of suitable phosphates include triphenyl phosphate, tri-cresyl phosphate, tri-2,3-xylyl phosphate, trimesityl phosphate, methyl diphenyl phosphate, dimethyl phenyl phosphate, ethyl di-cresyl phosphate, tripentyl phosphate, trihexyl phosphate, pentyl dihexyl phosphate, octyl diphenyl phosphate, trioctyl phosphate, octyl di-p-cresyl phosphate, tri-cyclohexyl phosphate, cyclohexyl diphenyl phosphate, dicyclohexyl phenyl phosphate, trinonyl phosphate, hexyl phenyl cresyl phosphate, 2-methylpentyl phenyl cresyl phosphate, octylphenyl cresyl phosphate, 2-ethylhexyl phenyl cresyl phosphate, n-octyl phenyl cresyl phosphate, nonyl phenyl cresyl phosphate, n-decyl phenyl cresyl phosphate, lauryl phenyl cresyl phosphate, butoxyethyl phenyl cresyl phosphate, 2-methylpentoxyethyl phenyl cresyl phosphate, hexoxyethyl phenyl cresyl phosphate, octoxyethyl phenyl cresyl phosphate, 2-ethylhexyloxyethyl phenyl cresyl phosphate, nonyloxyethyl phenyl cresyl phosphate, decyloxyethyl phenyl cresyl phosphate, lauroxyethyl phenyl cresyl phosphate, hexyl dicresyl phosphate, 2-ethylbutyl diphenyl phosphate, 2-methylpentyl dicresyl phosphate, n-hexyl diphenyl phosphate, octyl dicresyl phosphate, 2-ethylhexyl dicresyl phosphate, iso-octyl dicresyl phosphate, n-octyl diphenyl phosphate, 2-ethylhexyl diphenyl phosphate, iso-octyl diphenyl phosphate, nonyl diphenyl phosphate, trimethylhexyl diphenyl phosphate, nonyl dicresyl phosphate, n-decyl diphenyl phosphate, decyl dicresyl phosphate, lauryl diphenyl phosphate, dodecyl dicresyl phosphate, 2-ethylhexyl methyl phenyl phosphate, 2-ethylhexyl iso-butyl-p-chlorophenyl phosphate, n-octyl n-butyl phenyl phosphate, 2-ethylhexyl isobutylphenyl phosphate, 2-ethylhexyl n-butyl phenyl phosphate, 2-ethylhexyl sec-butyl cresyl phosphate, 2-ethylhexyl n-butyl cresyl phosphate, di(2-ethylhexyl)phenyl phosphate, 2-ethylhexyl capryl phenyl phosphate, 2-ethylhexyl 2-butyloctyl cresyl phosphate, n-butyl sec-tetradecyl phenyl phosphate, n-hexadecyl isopropyl phenyl phosphate, dodecyldiphenyl phosphate, tri-2-ethylhexyl phosphate, cresyl diphenyl phosphate, etc.

The preferred phosphates are those which contain from 12 to 30 carbon atoms. Examples of these are trioctyl phosphate (especially tri-2-ethylhexyl phosphate), 2-ethylhexyl diphenyl phosphate, tricresyl phosphate, dodecyldiphenyl phosphate, tri-butoxyethyl phosphate and cresyl diphenyl phosphate.

The other component of the plasticizer blends used in the present invention is a diester of an aliphatic dicarboxylic acid wherein the diester contains from 14 to 28 carbon atoms. The aliphatic dicarboxylic acid moiety of the diester contains from 4 to 9 carbon atoms. Examples of these dicarboxylic acids include succinic acid, glutaric acid, adipic acid, pimelic acid, suberic acid and azelaic acid. The preferred diacides are adipic acid and azelaic acid. The alcohol moiety of the ester is an alkyl or alkoxyalkyl radical containing from 3 to 12 carbon atoms. Mixtures of alkyl and alkoxyalkyl radicals as well as mixtures of straight chain and branched alkyl and/or alkoxyalkyl radicals may be used to form the diester.

Examples of suitable alkyl and alkoxyalkyl radicals include propyl, n-butyl, isobutyl, amyl, hexyl, heptyl, octyl, 2-ethylhexyl, nonyl, decyl, dodecyl, methoxymethyl, ethoxymethyl, butoxyethyl, diethylene glycol mono ethyl ether, etc. Mixtures of diesters may be used in the plasticizer blends of the present invention. The preferred diesters are the adipates. The especially preferred adipates are dihexyl adipate, $C_7$–$C_9$ adipates which are prepared from a mixture of Chd 7–$C_9$ straight chain and branched chain alcohols and dibutoxyethyl adipate.

One interesting aspect of the present invention is that many diester plasticizers which are normally incompatible with polyvinyl butyral resins when used alone, and many phosphate plasticizers which are unsuitable because they do not provide an interlayer with adequate energy absorbing capability at low temperatures, may be used in combination to provide a compatible blend which provides interlayers with improved properties. This permits the use of plasticizers which heretofore were unsuitable for use in interlayer material and provides a wider range of starting materials for the formulator. The components of the plasticizer blend as well as the blend itself must have a vapor pressure of less than 10 millimeters (mm) at 175°C. Plasticizers with vapor pressures higher than this have a tendency to cause bubbles, delaminations and other defects in the resulting laminate. Those skilled in the art can readily calculate the vapor pressure of the plasticizers or else convert available vapor pressure at a given temperature to vapor pressure at 175°C. in the event that the published data is given at a temperature other than 175°C.

The polyvinyl butyral resins employed in the present invention have Staudinger molecular weights ranging from about 50,000 to 600,000 and preferably from 75,000 to 250,000 and may be considered to be made up, on a weight basis, of from 12 to 25 percent hydroxyl groups, calculated as polyvinyl alcohol; 0 to 30 percent ester, and preferably acetate, groups, calculated as polyvinyl ester, e.g., acetate; and the balance substantially butyraldehyde acetal. The resin will preferably contain, on a weight basis, from 16 to 25 percent hydroxyl groups, calculated as polyvinyl alcohol.

The relative amounts of phosphate plasticizer and diester plasticizer used in the present invention will depend to a large degree upon the nature of the respective plasticizers, the composition of the polyvinyl butyral used and the balance of properties desired in the interlayer and the resulting laminated safety glass. In general, the ratio of phosphate to diester will lie within the range of from 5:95 to 95:5 and more preferably in the range of from 80:20 to 20:80.

However, one must select relative amounts of each component so as to provide a plasticizer blend which is compatible with the polyvinyl butyral resin within these ranges of compositions suitable for use as interlayer materials for laminated safety glass. The degree of compatibility will depend on the composition and the ratio of the respective plasticizers used in the blend as well as the total amount of plasticizer used. It will also depend to some extent on the composition of the polyvinyl butyral resin, especially upon the amount of polyvinyl alcohol units in the polyvinyl butyral resins. Upon reading the present specification one skilled in the art will be readily able to select the type and amount of plasticizer and the resin best suited for his individual application.

The test methods used in connection with the present invention are described below:

COMPATIBILITY

The compatibility of the plasticizer system with the resin is determined by blending appropriate amounts of plasticizer and polyvinyl butyral resin in a Brabender mixer equipped with sigma blades. The blending is carried out at 150°C. at 50 rpm for seven minutes. The resulting mixture is pressed into 30 mil sheets using a heated hydraulic press (300°F.) using 800 psi for five minutes. The sheet is then cut into samples 2 × 2 inches and stored at 100 percent relative humidity and 25°C. for five (5) days. The samples are then visually examined for exudation of the plasticizer which is an indication of incompatibility. If there is no visible exudation and if the sample does not stain paper upon which it is laid, then the plasticizer is determined to be compatible with the resin.

EDGE STABILITY

Edge stability is determined by preparing a laminate by interposing a 30 mil thick plasticized interlayer between two 12 × 12 × 0.100 inch panels of glass. The sandwich is then subjected to a temperature of about 275°F. at a pressure of 185 psi for approximately 10 minutes to laminate the glass to the interlayer. The laminates are then exposed in Florida, Arizona and Massachusetts at an angle of 45° and observed periodically for signs of edge delamination.

BOIL TEST (8 hours)

Laminated glass samples prepared according to the general procedure outlined above are placed in boiling water for two hours and then examined for bubble formation in the laminate. Those samples without bubble formation are then returned to the boiling water for six more hours and then examined. Absence of bubble formation indicates that the laminate has passed the boil test.

The following examples are set forth in illustrate the present invention and are not to be construed as limitations thereof. The references to parts of the respective platicizers in the plasticizer blends are parts per hundred parts of the plasticizer blend. The references to parts of plasticizer in the resin are to parts per hundred parts of polyvinyl butyral resin (PHR). All other parts and percentages are by weight unless otherwise indicated.

EXAMPLES 1 to 12

The following examples illustrate the ability of glass laminates prepared with the plasticized interlayers of the present invention to pass the Boil Test. The polyvinyl butyral resin used has a residual acetate content of less than 3 percent and a polyvinyl alcohol content in the range of from 19.8 to 21.8 percent. The alkalinity titer of the resin is in the range of from 100 to 120 and the moisture content of the interlayer is in the range of from 0.35 to 0.45. The glass used is clear float glass having a thickness of 0.100 inch. The control sample is plasticized with triethylene glycol di(2-ethyl butyrate) which is widely recognized as the standard plasticizer for use in automobile interlayers. The $C_7 - C_9$ adipate used in Examples 2, 3 and 8 is prepared by esterifying adipic acid with a mixture of heptyl ($C_7$) and nonyl ($C_9$) alcohols. This mixture contains 32 percent by weight of heptyl alcohol, 13 percent branched heptyl alcohol, 39 percent of n-nonyl alcohol and 16 percent of branched nonyl alcohol. This adipate is commercially available as Santicizer 97A from Monsanto Company. All of the plasticizer blends used have vapor pressures of less than 10 mm at 175°C. The results of this test are tabulated in Table I below.

dard triethylene glycol di(2-ethyl butyrate) plasticized interlayer (Control-Example 1). Moreover, the data show the absence of volatile material in the plasticizers of the present invention which would cause bubble formation in the laminate. The above examples also illustrate the wide ratio of phosphate to diester plasticizer that can be used in the particular phosphate/diester/resin combination used in the foregoing examples. Moreover, the above plasticizer blends are all compatible with the resin and the resulting laminates are found to have acceptable adhesion values as determined by the Pummel Test used in the laminated glass industry.

EXAMPLES 13 to 21

Examples 13 to 21 are set forth to illustrate the edge stability of the laminates prepared from the plasticized interlayers of the present invention. The laminates are prepared using polyvinyl butyral resin with less than 3 percent residual acetate groups and with polyvinyl alcohol (PVOH) contents in the range of from 19.8 to 21.8 percent and alkalinity titer contents in the range of from 100 to 120. The butyral resin is plasticized with various plasticizer blends formed into laminates as outlined above and then set out for outdoor exposures in Florida at an angle of 45°. At the end of four (4) months the laminates are examined visually for edge stability and compared to Control Example 14 wherein

TABLE I

Summary of Examples 1 to 12

| Example | Phosphate | Plasticizer Diester | Ratio(1) | Total Plasticizer Parts (2) | Boil Test |
|---------|-----------|---------------------|----------|-----------------------------|-----------|
| 1 | Control | Control | — | 42 (3) | Pass |
| 2 | tri-2-ethylhexyl | $C_7$-$C_9$ adipate | 60/40 | 46 | do. |
| 3 | do. | do. | 45/55 | 44 | do. |
| 4 | do. | dibutoxy ethyl adipate | 25/75 | 41 | do. |
| 5 | do. | dibutoxy ethyl adipate | 5/95 | 43 | do. |
| 6 | do. | dibutoxyethyl adipate | 10/90 | 43 | do. |
| 7 | 2-ethylhexyl-diphenyl | dibutoxyethyl adipate | 25/75 | 43 | do. |
| 8 | do. | $C_7$-$C_9$ adipate | 40/60 | 46 | do. |
| 9 | do. | dibutyl adipate | 20/80 | 35 | do. |
| 10 | do. | dihexyl adipate | 40/60 | 41 | do. |
| 11 | do. | dibutoxyethyl adipate | 5/95 | 42 | do. |
| 12 | do. | dibutoxyethyl adipate | 10/90 | 42 | do. |

(1) Ratio of phosphate/diester (weight/weight)
(2) Parts of plasticizer blend per hundred parts of polyvinyl butyral resin (PHR).
(3) Resin plasticized with 42 parts of triethylene glycol di-(2-ethylbutyrate).

The data in Table I above shows that laminates made from polyvinyl butyral interlayer plasticized with the plasticizer blends of the present invention are as resistant to boiling water as the laminate made with standard triethylene glycol di(2-ethyl butyrate) plasticized interlayer is plasticized with 42 parts per hundred parts of resin of triethylene glycol di(2-ethyl butyrate). A summary of the test samples and the test results is tabulated in Table II below.

TABLE II

SUMMARY OF FLORIDA EXPOSURE TESTS

| Example | Phosphate | Diester | Ratio(1) | Total (2) Plasticizer | Edge Stability(4) |
|---------|-----------|---------|----------|-----------------------|-------------------|
| 13 | Control | Control | — | 42 (3) | 0 |
| 14 | 2-ethylhexyl diphenyl | $C_7$-$C_9$ adipate | 40/60 | 46 | + |
| 15 | do. | do. | 50/50 | 43 | + |
| 16 | do. | dihexyl adipate | 40/60 | 41 | + |

TABLE II—Continued

SUMMARY OF FLORIDA EXPOSURE TESTS

| Example | Phosphate | Diester | Ratio(1) | Total Plasticizer (2) | Edge Stability(4) |
|---------|-----------|---------|----------|----------------------|-------------------|
| 17 | do. | dibutoxyethyl adipate | 25/75 | 43 | 0 |
| 18 | do. | dibutyl adipate | 20/80 | 35 | — |
| 19 | tri-2-ethylhexyl | $C_7$–$C_9$ adipate | 45/55 | 44 | + |
| 20 | do. | do. | 40/60 | 46 | + |
| 21 | do. | dibutoxyethyl adipate | 25/75 | 41 | 0 |

(1) Ratio of phosphate/diester (weight/weight).
(2) Parts of plasticizer blend per hundred parts of polyvinyl butyral resin (PHR).
(3) Resin plasticized with 42 parts of triethylene glycol di-(2-ethylbutyrate).
(4) Edge stability as compared to control
    0 = equivalent to control
    + = better than control
    – = worse than control.

The $C_7$–$C_9$ adipate used in the above examples is the same as that used in Examples 2, 3 and 8 above. The data in Table II indicate that the interlayers used in Examples 14, 15, 16, 19 and 20, which are plasticized according to the teachings of the present invention, exhibit edge stability better than that observed in Control Example 13. Examples 17 and 21 which are plasticized according to the teachings of the present invention, exhibit edge stability equivalent to that observed in Control Example 13. As stated above, Control Example 13 uses an interlayer plasticized with triethylene glycol di(2-ethyl butyrate) which is widely recognized as a standard plasticizer for use in polyvinyl butyral interlayers for automobile safety glass.

The dibutyl adipate used in Example 18 has a vapor pressure of 10 mm at 165°C. and would have a higher vapor pressure at 175°C. Thus, it does not meet the requirement that the plasticizer have a vapor pressure of less than 10 mm at 175°C. Moreover, interlayer material plasticized with dibutyl adipate suffers loss of plasticizer upon standing. Presumably, the plasticizer volatilizes pointing out the need for observing the minimum vapor pressure requirements in the selection of a plasticizer for use in the present invention.

EXAMPLES 22 to 36

The following Examples 22 to 36 illustrate the need to carefully match the relative amounts of phosphate plasticizer and diester plasticizer with the polyvinyl alcohol content (%PVOH) of the polyvinyl butyral resin in order to avoid incompatibility.

A summary of the test samples and test results is tabulated in Table III below.

TABLE III

SUMMARY OF COMPATIBILITY STUDIES

| Example | % PVOH(1) | Phosphate | Plasticizer Blend Diester | Ratio(2) | Total Plasticizer (3) | Compatibility (4) |
|---------|-----------|-----------|---------------------------|----------|----------------------|-------------------|
| 22 | 20.8 | none | dihexyl adipate | | 50 | No |
| 23 | 18.8 | do. | do. | | 50 | No |
| 24 | 18.2 | do. | $C_7$–$C_9$ adipate | | 42 | No |
| 25 | 18.8 | 2-ethylhexyl diphenyl | dibutoxyethyl adipate | 25/75 | 42 | Yes |
| 26 | 18.8 | tri-2-ethyl hexyl | $C_7$–$C_9$ adipate | 60/40 | 42 | Yes |
| 27 | 18.8 | 2-ethylhexyl diphenyl | dihexyl adipate | 40/60 | 42 | Yes |
| 28 | 18.8 | tri-2-ethyl hexyl | dibutoxyethyl adipate | 25/75 | 39 | Yes |
| 29 | 20.8 | 2-ethylhexyl diphenyl | dihexyl adipate | 10/90 | 50 | No |
| 30 | 20.8 | do. | do. | 25/75 | 50 | No |
| 31 | 20.8 | do. | do. | 30/70 | 50 | Yes |
| 32 | 20.8 | do. | do. | 25/75 | 40 | Yes |
| 33 | 20.8 | do. | $C_7$–$C_9$ adipate | 40/60 | 43 | No |
| 34 | 20.8 | do. | do. | 50/50 | 50 | Yes |
| 35 | 20.8 | cresyl diphenyl | do. | 50/50 | 42 | Yes |
| 36 | 20.8 | do. | dihexyl adipate | 50/50 | 42 | Yes |

(1) % polyvinyl alcohol in butyral resin
(2) Ratio of phosphate/diester (weight/weight)
(3) Parts of plasticizer blend per hundred parts of polyvinyl butyral resin (PHR).
(4) Yes = the system is compatible
    No = the system is not compatible The $C_7$–$C_9$ adipate used is the same as that used in Examples 2, 3 and 8 above. Referring to Table III above, Examples 22 and 23 illustrate that at 50 parts per hundred parts of resin, dihexyl adipate is incompatible with the polyvinyl butyral resin. However, at lower polyvinyl alcohol contents the dihexyl adipate is compatible with the resin. This points out the sensitivity of the plasticizer systems to the polyvinyl alcohol contents of the resin and the need to match the plasticizer system to the particular resin used.

Note further that when dihexyl adipate is blended with at least 30 percent of a phosphate plasticizer as in Example 31, the system is compatible. A similar observation is made when comparing Example 24 (42 parts of $C_7$–$C_9$ adipate) with Example 26 (60/40 tri-2-ethylhexyl phosphate/$C_7$–$C_9$ adipate).

Examples 30 to 31 illustrate that for the 2-ethylhexyl diphenyl phosphate/dihexyl adipate system at a fixed amount of total plasticizer (50 PHR) compatibility is obtained by increasing the ratio of phosphate to adipate. A similar observation is made when comparing Examples 33 and 34 which use a $C_7$–$C_9$ adipate.

Examples 30 and 32 illustrate that for a given system compatibility may be obtained by decreasing the total amount of plasticizer.

All the phosphate plasticizers used in the above examples are compatible with the polyvinyl butyral resins used above at a level of 50 parts of plasticizer per hundred parts of resin.

The plasticized resins from Examples 26, 34 and 35 above are extruded into sheet material using conventional extrusion techniques. The resulting sheet is found to be comparable to sheet extruded from polyvinyl butyral resin containing 42 parts of triethylene glycol di(2-ethyl butyrate).

Polyvinyl butyral resin plasticized with the plasticizer blends of the present invention and laminates made therefrom are tested for haze, inherent blocking, modulus versus temperature, impact strength, resistance to hydrolysis and water vapor absorption and found to be comparable to polyvinyl butyral resin containing 42 parts triethylene glycol di(2-ethyl butyrate).

Other combinations of phosphate and diester plasticizer which may be used in the present invention include the following:

| Phosphate | Diester |
|---|---|
| tricresyl | dipropyl azelate |
| do. | didecyl azelate |
| do. | dipentyl succinate |
| tributoxyethyl | didodecyl succinate |
| tri-2-ethylhexyl | diundecyl adipate |
| triphenyl | diundecyl adipate |
| tributyl | decyl-undecyl pimellate |
| tridecyl | dioctyl azelate |
| dodecyl-diphenyl | octyl decyl adipate |

Laminated glazing units may also be prepared from the plasticized interlayers of the present invention using rigid transparent materials other than glass.

The present invention also contemplates the use of various adjuncts and additives in the plasticized polyvinyl butyral interlayers of the present invention. Such materials would include dyes, pigments, stabilizers, antioxidants, titer control agents, adhesion modifiers, etc.

From the foregoing, it should be apparent that many variations and modifications can be made in the present invention without departing from the spirit and scope thereof.

What is claimed is:

1. A plasticizer system for polyvinyl butyral interlayers used in laminated safety glass which plasticizer system comprises a blend of (1) at least one phosphate plasticizer and (2) at least one adipate plasticizer; wherein the phosphate plasticizer corresponds to the following general formula:

$$R_3PO_4$$

wherein R is selected from the group consisting of aryl, alkaryl wherein the alkyl group contains from 1 to 3 carbon atoms, alkyl of from 1 to 12 carbon atoms, alkoxyalkyl of from 1 to 9 carbon atoms and cycloalkyl, with the proviso that when all of the radicals represented by R in a given compound are alkyl radicals each alkyl radical must have 4 or more carbon atoms; wherein the adipate plasticizer is selected from the group consisting of dihexyl adipate and a $C_7$–$C_9$ adipate; wherein the phosphate plasticizer and the diester plasticizer have vapor pressures of less than 10 millimeters (mm) at 175°C.; and wherein the ratio of phosphate plasticizer to diester plasticizer is in the range from 80:20 to 20:80.

2. A plasticizer system as in claim 1 wherein the phosphate plasticizer is is tri-2-ethylhexyl phosphate.

3. A plasticizer system as in claim 1 wherein the phosphate plasticizer is 2-ethylhexyl diphenyl phosphate.

4. A plasticizer system as in claim 1 wherein the phosphate plasticizer is cresyl diphenyl phosphate.

5. A plasticizer system as in claim 2 wherein the adipate is dihexyl adipate.

6. A plasticizer system as in claim 3 wherein the adipate is a $C_7$–$C_9$ adipate.

7. A plasticizer system as in claim 1 wherein the phosphate plasticizer is selected from the group consisting of tri-2-ethylhexyl phosphate, 2-ethylhexyl diphenyl phosphate, tricresyl phosphate, tributoxyethyl phosphate, dodecyl diphenyl phosphate and cresyl diphenyl phosphate; and wherein the adipate plasticizer is selected from the group consisting of dihexyl adipates and $C_7$–$C_9$ adipates prepared from adipic acid and a mixture of straight chain and branched chain heptyl and nonyl alcohols.

* * * * *